United States Patent
Yin et al.

(10) Patent No.: US 12,067,748 B2
(45) Date of Patent: Aug. 20, 2024

(54) SELECTION OF IMAGE LABEL COLOR BASED ON IMAGE UNDERSTANDING

(71) Applicant: INTERNATIONAL BUSINESS MACHINES CORPORATION, Armonk, NY (US)

(72) Inventors: Kun Yan Yin, Ningbo (CN); Xue Ping Liu, Beijing (CN); Yun Jing Zhao, Beijing (CN); Fei Wang, Dalian (CN); Yu Tao Wu, Changshu (CN); Guan Chao Li, Shanghai (CN)

(73) Assignee: International Business Machines Corporation, Armonk, NY (US)

(*) Notice: Subject to any disclaimer, the term of this patent is extended or adjusted under 35 U.S.C. 154(b) by 394 days.

(21) Appl. No.: 17/487,337

(22) Filed: Sep. 28, 2021

(65) Prior Publication Data

US 2023/0098133 A1  Mar. 30, 2023

(51) Int. Cl.
*G06K 9/00* (2022.01)
*G06T 7/90* (2017.01)
(Continued)

(52) U.S. Cl.
CPC ............... *G06T 7/90* (2017.01); *G06V 10/22* (2022.01); *G06V 10/50* (2022.01); *G06V 10/56* (2022.01);
(Continued)

(58) Field of Classification Search
CPC ............ G06T 7/90; G06T 2207/20081; G06T 2207/10024; G06V 10/22; G06V 10/50;
(Continued)

(56) References Cited

U.S. PATENT DOCUMENTS 7,457,462 B2  11/2008  Aggarwal
7,907,778 B2   3/2011  Xiao
(Continued)

FOREIGN PATENT DOCUMENTS

KR   20170131813 A   11/2017

OTHER PUBLICATIONS

Jyoti Narwade Manoorkar et al., Local and Global Color Histogram Feature for Color Content-Based Image Retrieval System, https://www.researchgate.net/publication/303809093, Jan. 2016, DOI: 10.1007/978-981-10-0767-5_32, 8 pages.
(Continued)

*Primary Examiner* — Duy M Dang
(74) *Attorney, Agent, or Firm* — Schmeiser, Olsen & Watts, LLP; Edward Wixted

(57) ABSTRACT

A system and method for adaptive color assignments to image labels during annotation of datasets includes preparing a dataset for image labeling by an annotator by: leveraging a global color analyzer to perform a global color distribution of a plurality of images to identify one or more overall colors present in the plurality of images, and a local color analyzer to perform a local color distribution for each image to identify one or more colors present in an area of interest of the image, and selecting a plurality of candidate colors to be used as image labels by the annotator, based on an output of the global color analyzer and an output of the local color analyzer.

20 Claims, 15 Drawing Sheets

(51) Int. Cl.
  *G06V 10/22*    (2022.01)
  *G06V 10/50*    (2022.01)
  *G06V 10/56*    (2022.01)
  *G06V 10/762*   (2022.01)
  *G06V 10/774*   (2022.01)

(52) U.S. Cl.
  CPC ........ *G06V 10/762* (2022.01); *G06V 10/7747* (2022.01); *G06T 2207/20081* (2013.01)

(58) Field of Classification Search
  CPC .. G06V 10/56; G06V 10/762; G06V 10/7747; G06V 10/42; G06V 10/44; G06V 10/774
  See application file for complete search history.

(56) References Cited

U.S. PATENT DOCUMENTS

| | | | | |
|---|---|---|---|---|
| 2003/0195883 | A1* | 10/2003 | Mojsilovic | G06V 10/40 |
| 2008/0317339 | A1* | 12/2008 | Steinberg | G06V 40/193 |
| | | | | 382/167 |
| 2014/0376819 | A1 | 12/2014 | Liu | |
| 2015/0227817 | A1 | 8/2015 | Lin | |

OTHER PUBLICATIONS

Yohei Tsurugai et al., Region-Based Segmentation and Auto-Annotation for Color Images, https://ieeexplore.ieee.org/document/4604153, International Conference on Intelligent Information Hiding and Multimedia Signal Processing, 978-0-7695-3278-3/08 @ 2008 IEEE DOI 10.1109/IIH-MSP.2008.338, 4 pages.

Jian-She Ma et al, Semantic Image Labeling with Histograms of Oriented Gradient and Gray Level Co-occurrence Matrix, https://www.atlantis-press.com/article/25871011.pdf, Advances in Computer Science Research, vol. 44 (WCSN 2016), 5 pages.

Mell, Peter et al.; "The NIST Definition of Cloud Computing;" National Institute of Standards and Technology; Special Publication 800-145; Sep. 2011; 7 pages.

Yan et al., Hierarchical Saliency Detection, 2013 IEEE Conference on Computer Vision and Pattern Recognition, 8 pages.

* cited by examiner

SELECTION OF IMAGE LABEL COLOR BASED ON IMAGE UNDERSTANDING

BACKGROUND

Image labeling is a key step to computer vision tasks. To build a robust computer vision model for AI training, datasets should be large enough and cover as many dimensions as possible.

SUMMARY

An embodiment of the present invention relates to a method, and associated computer system and computer program product for adaptive color assignments to image labels during annotation of datasets. A processor of a computing system prepares a dataset for image labeling by an annotator by: leveraging a global color analyzer to perform a global color distribution of a plurality of images to identify one or more overall colors present in the plurality of images, and a local color analyzer to perform a local color distribution for each image to identify one or more colors present in an area of interest of the image, and selecting a plurality of candidate colors to be used as image labels by the annotator, based on an output of the global color analyzer and an output of the local color analyzer.

DETAILED DESCRIPTION

In brief overview, datasets need to be prepared before the datasets are annotated and ultimately used for training AI models. The datasets, which can contain a plurality of images of one or more objects, are labeled by bounding boxes and/or segmentation maps. Image labeling should avoid missing labeling or incorrect labeling. Missed labels or incorrect labels are sometimes the result of the color of the image label (e.g. bounding box) being indistinguishable from the color of the pixels surrounding the label. For example, during training of an AI model using an annotated dataset, the color of an image label or other annotation is confused with the color of the image pixels. Thus, there is a need to make image label colors distinguishable from the colors of the image pixels.

Figure 1:
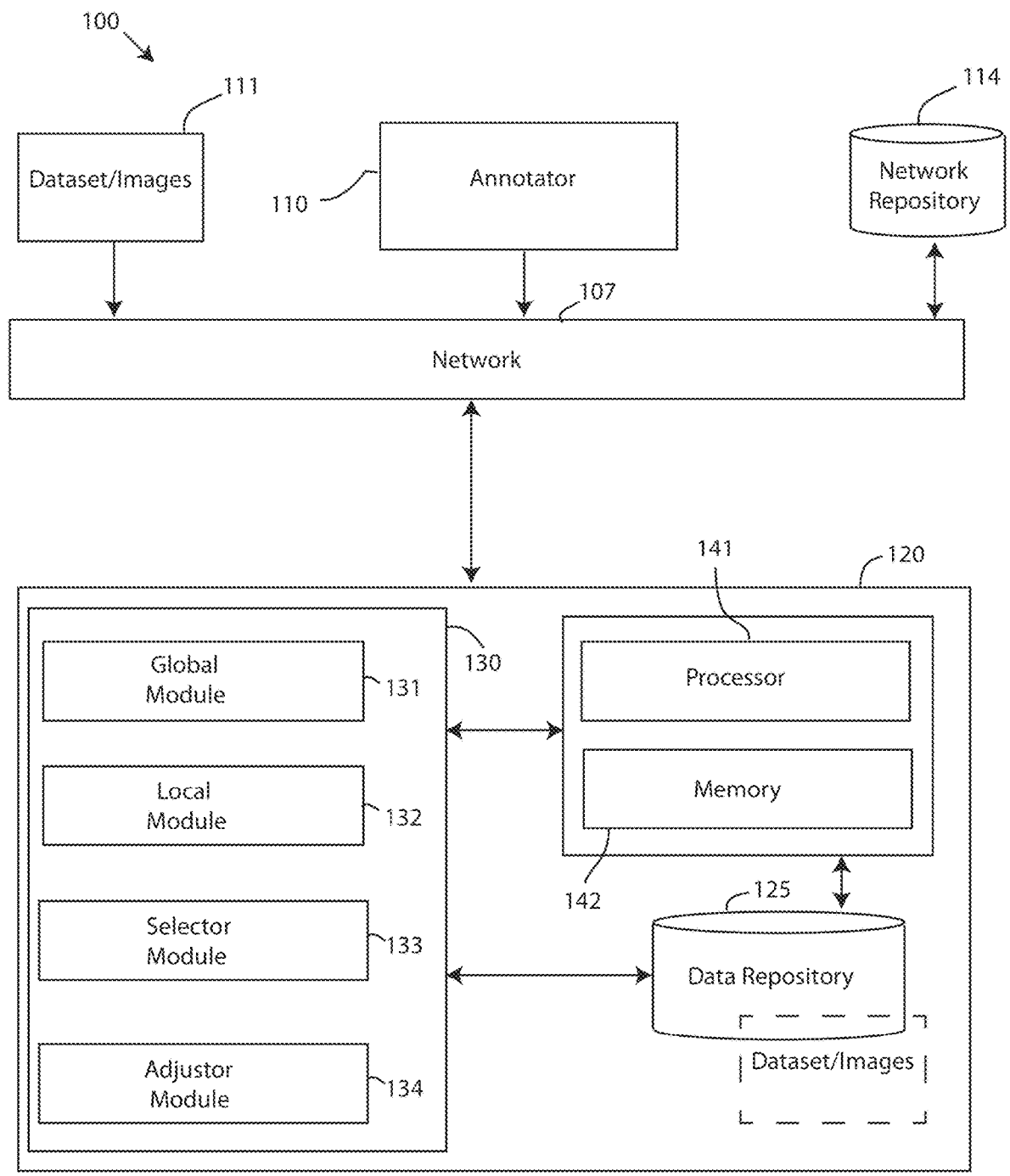
FIG. 1 depicts a block diagram of an image label color selection system, in accordance with embodiments of the present invention.

Referring to the drawings, FIG. 1 depicts a block diagram of an image label color selection system 100, in accordance with embodiments of the present invention. The image label color selection system 100 is a system for selecting a suitable color for an image label to be used when annotating a dataset. The image label color selection system 100 may be useful for preparing a dataset, such as a plurality of images, for annotation by an annotator.

The image label color selection system 100 includes a computing system 120. Embodiments of the computing system 120 include a computer system, a computer, a server, one or more servers, a backend computing system, and the like.

Furthermore, the image label color selection system 100 includes an annotator 110 that is communicatively coupled to the computing system 120 over a network 107. For instance, information/data, such as a prepared dataset and color classification for image labels, is transmitted to and/or received from the annotator 110 over a network 107. In an exemplary embodiment, the network 107 is a cloud computing network. Further embodiments of network 107 refer to a group of two or more computer systems linked together. Network 107 includes any type of computer network known by individuals skilled in the art. Examples of network 107 include a LAN, WAN, campus area networks (CAN), home area networks (HAN), metropolitan area networks (MAN), an enterprise network, cloud computing network (either physical or virtual) e.g. the Internet, a cellular communication network such as GSM or CDMA network or a mobile communications data network. In one embodiment, the architecture of the network 107 is a peer-to-peer, wherein in another embodiment, the network 107 is organized as a client/server architecture. In alternative embodiment, the annotator is a part of the computing system 120. The data output by the annotator 110 is transmitted to the computing system 120 via data bus lines connected to the processor 141 of the computing system 120.

In an exemplary embodiment, the network 107 further comprises, in addition to the computing system 120, a connection to one or more network-accessible knowledge bases 114, which are network repositories containing information relating to security policies, items permitted and not permitted, etc., network repositories or other systems connected to the network 107 that are considered nodes of the network 107. In an embodiment where the computing system 120 or network repositories allocate resources to be used by the other nodes of the network 107, the computing system 120 and network-accessible knowledge bases 114 is referred to as servers.

The network-accessible knowledge bases 114 is a data collection area on the network 107 which backs up and save all the data transmitted back and forth between the nodes of the network 107. For example, the network repository is a data center saving and cataloging the candidate colors and various assignments of colors to specific image labels, and the like, to generate both historical and predictive reports regarding a particular color allocation strategy. In an exemplary embodiment, a data collection center housing the network-accessible knowledge bases 114 includes an analytic module capable of analyzing each piece of data being stored by the network-accessible knowledge bases 114. Further, the computing system 120 can be integrated with or as a part of the data collection center housing the network-accessible knowledge bases 114. In an alternative embodiment, the network-accessible knowledge bases 114 are a local repository that is connected to the computing system 120.

The computing system 120 is configured to prepare a dataset 111 for image labeling by an annotator 110. The dataset 111 is a plurality of images which are to be labeled by an annotator 110, and ultimately used to train an AI model for various computer vision tasks. The datasets 111 can be stored in a remote database and accessible over network 107 and/or can be stored locally on the computing system 120 in a data repository 125. As an example, the dataset 111 can be hundreds or even thousands of photographs of an object. The photographs may contain one or more features that require labeling (e.g. defect in object, missing component of object, shape of feature of object, etc.). The one or more features present in the photographs are labeled with an image label, such as a bounding box, using an annotator, such as annotator 110.

The annotator 110 is a tool for annotating the dataset 111, which are used as training data for AI computer vision models. The annotator 110 can be an auto-labeling tool for auto-labeling the entire dataset 111 of images based on a subset of previously labeled (e.g. manually labeled) images, or a software tool that allows for manual labeling images contained in the dataset 111. To improve the annotation of the dataset 111 by the annotator 110, the image label color selection system 100 automatically selects candidate colors for the image labels based on image understanding. For example, candidate colors are selected so that a color of the image label used by the annotator 110 is visually distinguishable from the one or more overall colors present in the dataset 111 and the one or more colors present in areas of interest of each image of the dataset 111.

Figure 2:
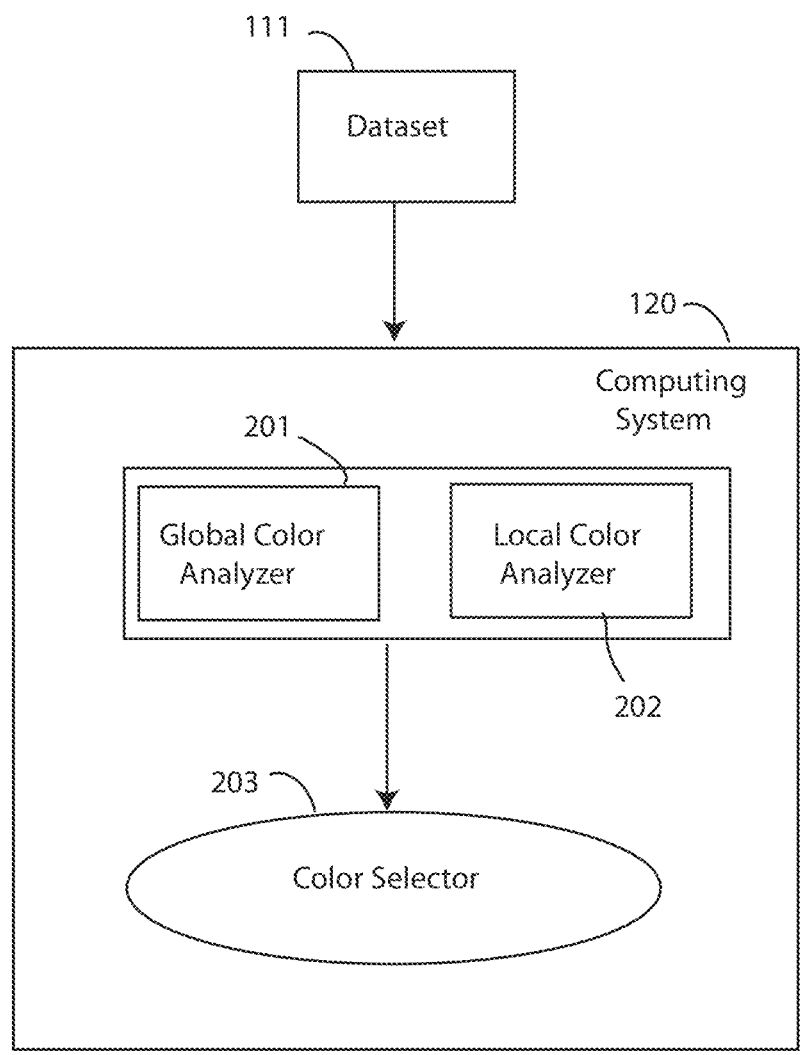
FIG. 2 depicts another block diagram of image label color selection system having a global color analyzer and a local color analyzer, in accordance with embodiments of the present invention.
Figure 3:
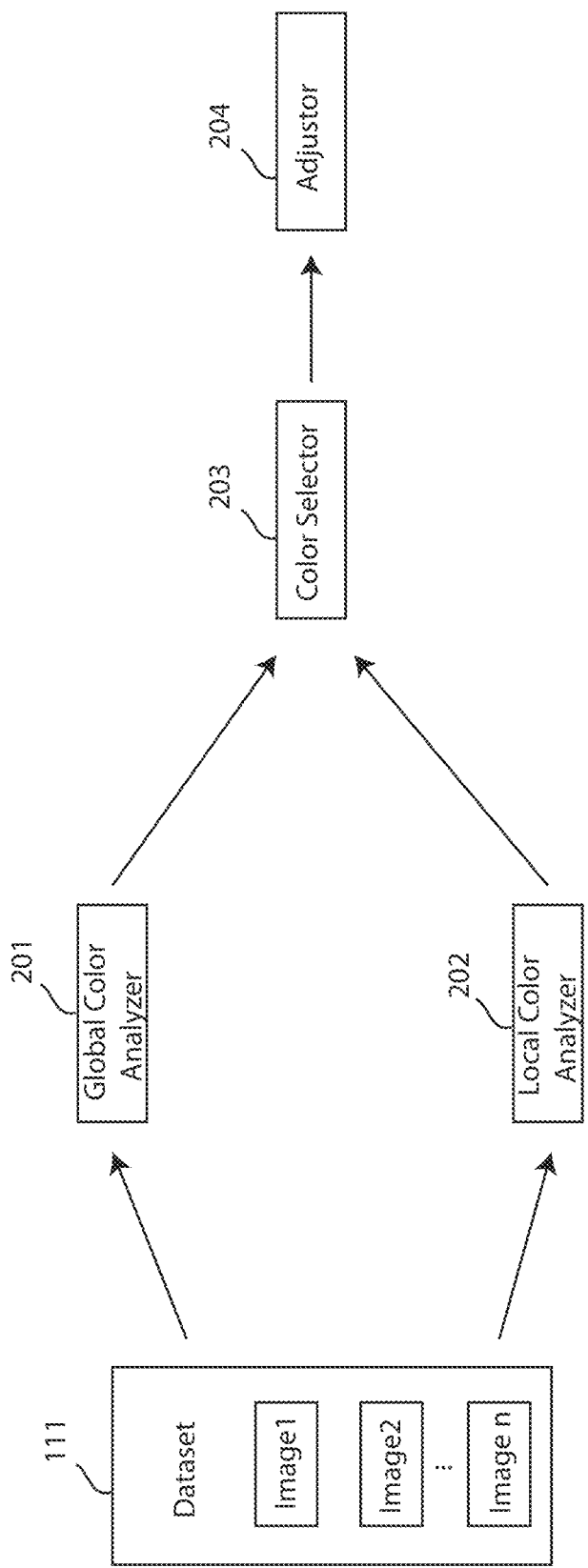
FIG. 3 shows a system overview of how color assignments are made to image labels for annotation of datasets, in accordance with embodiments of the present invention.

FIG. 2 another block diagram of the image label color selection system 100 having a global color analyzer 201, a local color analyzer 202, and a color selector 203, in accordance with embodiments of the present invention. FIG. 3 shows a system overview of how color assignments are made to image labels for annotation of datasets, in accordance with embodiments of the present invention. The processor 141 of the computing system 120 leverages both the global color analyzer 201 and the local color analyzer 202 to perform a global color distribution of the dataset 111 to identify one or more overall colors present in the plurality of images, and to perform a local color distribution for each image of the dataset 111 to identify one or more colors present in an area of interest of each image. The processor 141 then utilizes the color selector 203 to select a plurality of candidate colors to be used as image labels by the annotator 110, based on an output of the global color analyzer 201 and an output of the local color analyzer 202. Optionally, a brightness of the image label color is adjusted based on the brightness of the image.

Referring back to FIG. 1, the computing system 120 of the image label color selection system 100 is equipped with a memory device 142 which stores various data/information/code, and a processor 141 for implementing the tasks associated with the image label color selection system 100. An image label color selection application 130 is loaded in the memory device 142 of the computing system 120. The image label color selection application 130 prepares a dataset for image labeling by an annotator. The image label color selection application 130 can be an interface, an application, a program, a module, or a combination of modules. In an exemplary embodiment, the image label color selection application 130 is a software application running on one or more back end servers (e.g. computing system 120), servicing annotator 110.

The image label color selection application 130 of the computing system 120 includes a global module 131, a local module 132, a selector module 133, and an adjustor module 134. A "module" refers to a hardware-based module, a software-based module, or a module that is a combination of hardware and software. Hardware-based modules include self-contained components such as chipsets, specialized circuitry and one or more memory devices, while a software-based module is a part of a program code or linked to the program code containing specific programmed instructions, which is loaded in the memory device of the computing system 120. A module (whether hardware, software, or a combination thereof) is designed to implement or execute one or more particular functions or routines.

The global module 131 includes one or more components of hardware and/or software program code for leveraging the global color analyzer 201 to perform a global color distribution of a plurality of images comprising the dataset 111 to identify one or more overall colors present in the plurality of images. For instance, the global module 131 analyzes all of the images within the dataset 111 to determine an overall color or colors that are present across the entire dataset 111. As an example, if the dataset comprises 150 images of a stop sign at an intersection, the global color distribution will likely determine that the overall colors across the dataset are red and white, associated with the sign, as well as gray or light blue associated with the road and sky background. In this example, the colors red, white, gray, and light blue should be avoided as colors of the image labels, such as the boundary line of or a shading within a bounding box. Instead, colors visually distinguishable from theses colors should be used as the colors for the image labels, as will be described in more detail below.

Figure 4:
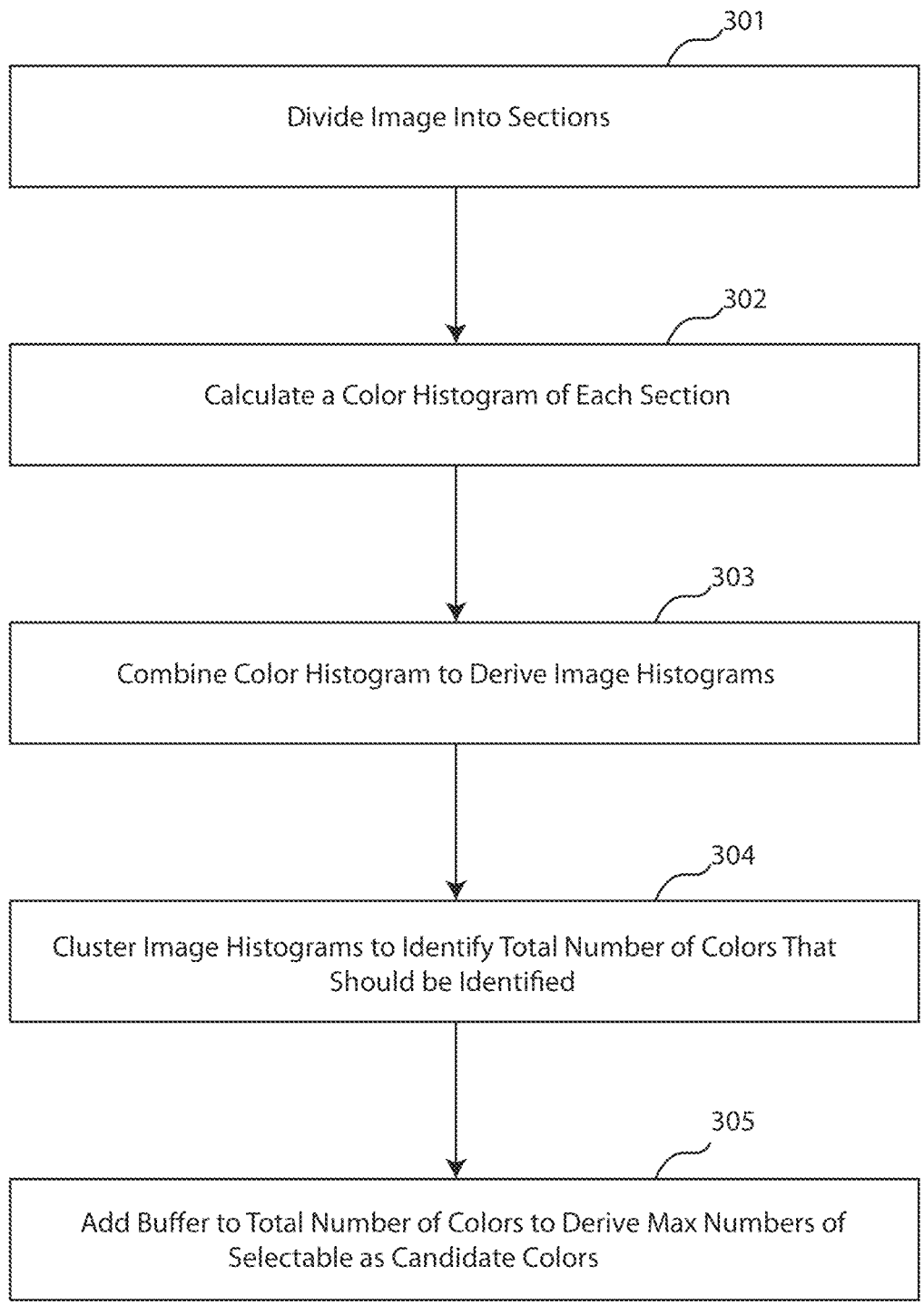
FIG. 4 depicts a flowchart of a method for performing a global color distribution, according to embodiments of the present invention.
Figure 5:
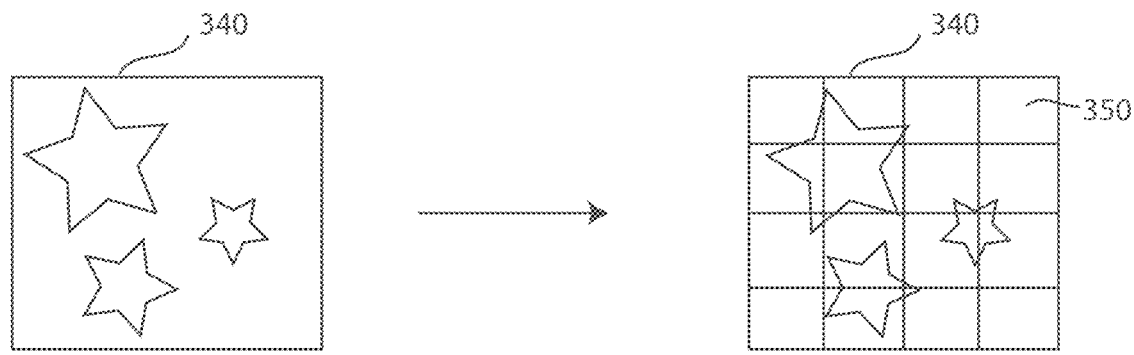
FIG. 5 depicts a schematic view of an image divided into a plurality of sections, in accordance with embodiments of the present invention.
Figure 6:
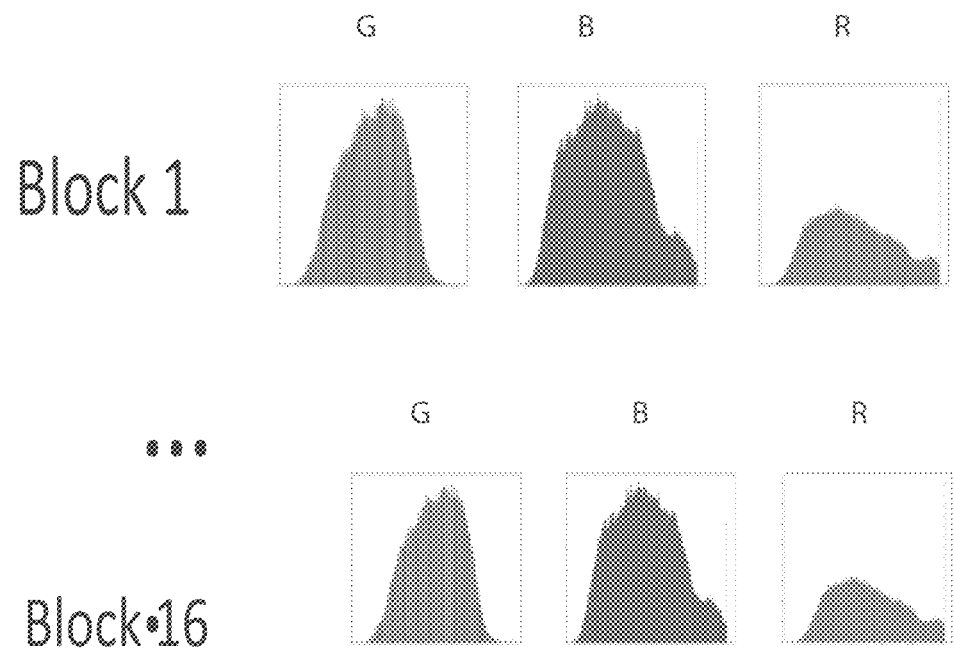
FIG. 6 depicts exemplary color histograms for two blocks of the image divided in FIG. 5, in accordance with embodiments of the present invention.

FIG. 4 is a flowchart of a method for performing a global color distribution, according to embodiments of the present invention. The global module 131 divides each image into a plurality of sections, shown as step 301. For instance, the image 340 under review is divided into a grid or a plurality of sections 350, as shown in FIG. 5. Each section 350, or block, of the image 340 is analyzed and a color histogram is calculated for each block 250, shown as step 302 in FIG. 4. In the example shown in FIG. 5, there are sixteen blocks, so sixteen color histograms are calculated. FIG. 6 depicts an exemplary color histogram for Block 1 and Block 16, in which Blocks 2-15 are not shown. The color histograms represent a number of pixels associated with red (R), green (G), and blue (B), of the specific block 350 of the image 340. At step 303, the color histograms for each block 350 are combined to derive an image histogram, which represents the number of pixels associated with red (R), green (G), and blue (B), of the image 340 as a summation of the blocks 350. Steps 301-303 are repeated for all images in the dataset. A weighting scheme is optionally applied. Therefore, the global color distribution determines the one or more overall colors present in the plurality of images.

Figure 7:
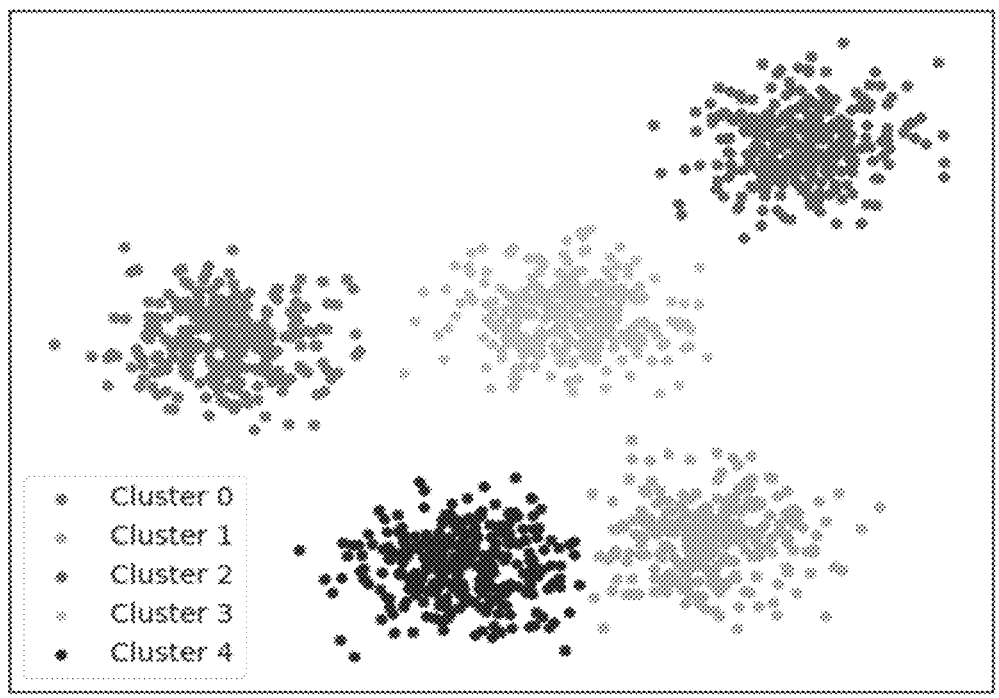
FIG. 7 depicts an embodiment of clustered histograms, in accordance with embodiments of the present invention.

In addition to determining an overall color or colors the dataset 111, the global module 131 can determine a total number of colors that should be identified for image labeling purposes. Step 304 clusters the image histograms to determine a total one or more overall colors present in the plurality of images, as shown in FIG. 7, and uses a buffer to determine a maximum (or minimum) number of colors that should be identified as part of the global color distribution of the dataset. The buffer (e.g. 50%) can ensure that a satisfactory number of colors are selected. In the example illustrated in FIG. 7, there are five total colors that are present overall in the images. Applying a buffer to the results in FIG. 7, the total number of colors that should be selected for image labeling is seven.

The local module 132 includes one or more components of hardware and/or software program code for performing a local color distribution for each image to identify one or more colors present in an area of interest of the image. For instance, the local module 132 analyzes each specific image to predicts what the object(s) is in the image and how many object(s) are contained in the image. The local module 132 isolates an area of interest within the image based on the prediction of what the object(s) is and how many object(s) are contained within the image. Then, the local module 132 determines one or more colors present in the isolated area of interest, for each image in the dataset. The global color distribution accounts for the image as a whole, the background pixels, object pixels, etc., while the local color distribution accounts for the pixel information of one or more areas of interest of each image.

Figure 8:
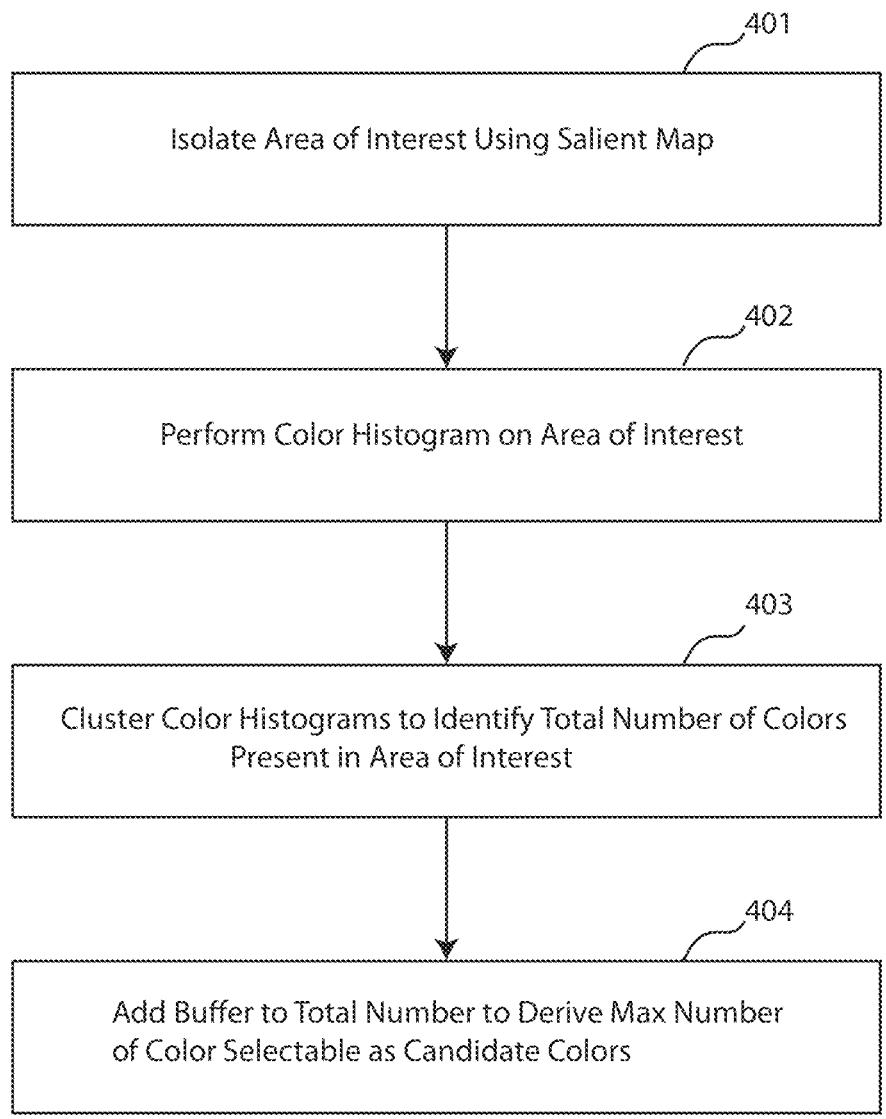
FIG. 8 is a flowchart of a method for performing a local color distribution, according to embodiments of the present invention.
Figure 9:
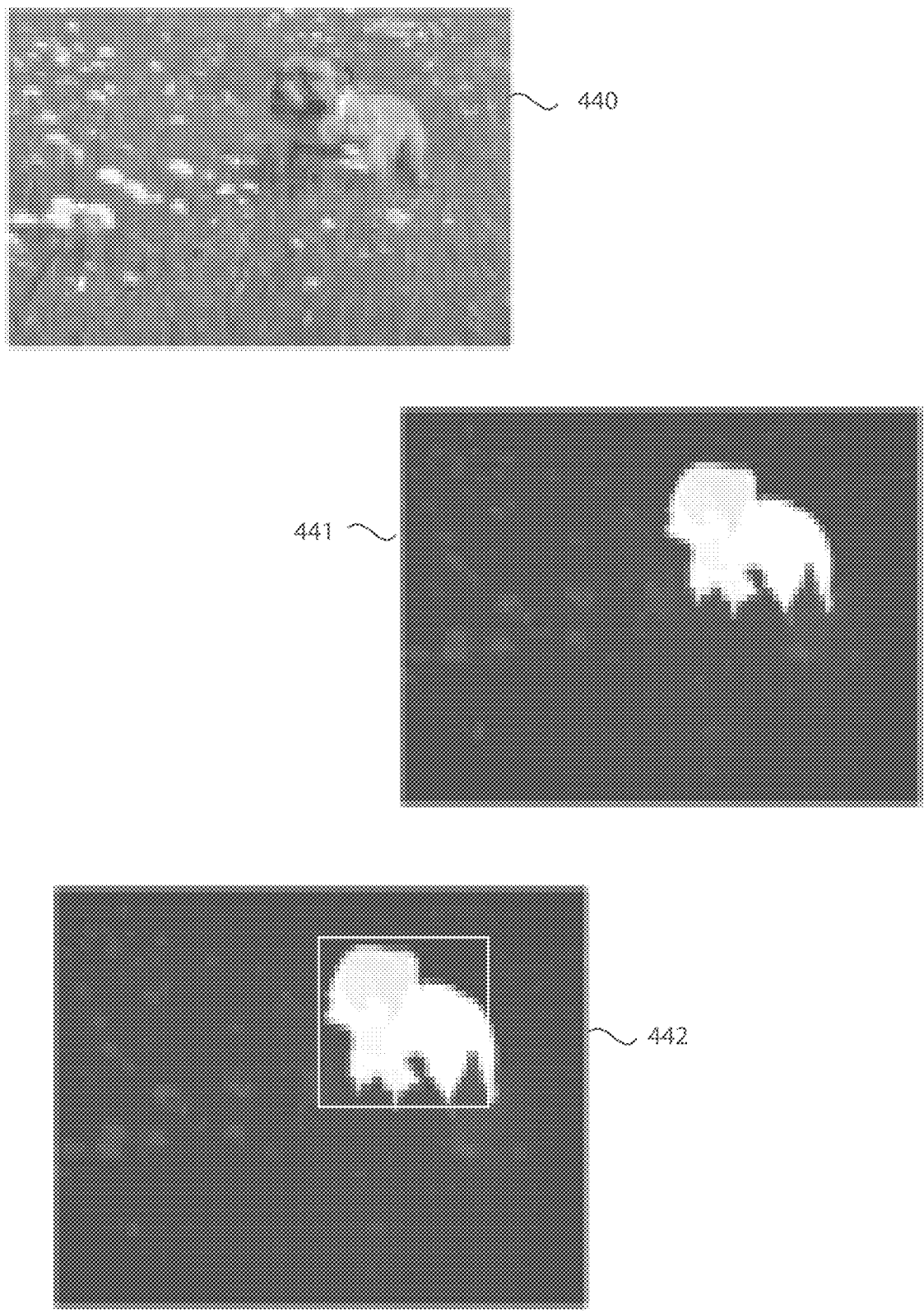
FIG. 9 depicts a sequence showing a use of a salient map as part of the local color distribution, according to embodiments of the present invention.

FIG. 8 is a flowchart of a method for performing a local color distribution, according to embodiments of the present invention. The local module 132 isolates an area of interest using a salient map, shown as step 401. The salient map is leveraged by the local module 132 to predict the object, cut the object from the image, determine the color information from the object (e.g. area of interest), and then cluster the objects and the color information associated therewith to determine one or more colors present in the object(s) in the dataset. FIG. 9 depicts a sequence showing a use of a salient map as part of the local color distribution, according to embodiments of the present invention. An image 440, for example, one image of many images forming a dataset 110, shows an image of a dog with brown, tan, and white fur, with a black nose in a green field with yellow flowers. The local color module 132 utilizes salient map algorithms to detect the image salient map 441 of the image 440. The image salient map 441 highlights the brown dog in white color while the background (e.g. green field, yellow flowers) are converted to black color. Candidate objects of the image salient map 441 highlighted in white color are boxed or isolated, as shown in image 442. The isolated or boxed objects are cut from the images for color histogram analysis by the local module 132. In the example shown in FIG. 9, the brown dog, which represents the area of interest of the image, is isolated and cut from the image for color information analysis.

At step 402, the local color module 132 performs a color histogram on the isolated area of interest. The color histograms represent a number of pixels associated with red (R), green (G), and blue (B), of the area of interest of the image. Step 403 clusters the color histograms of each image from the dataset to determine a total one or more colors present in an area of interest of the images, and step 404 uses a buffer to determine a maximum (or minimum) number of colors that should be identified as part of the local color distribution of the dataset. The buffer (e.g. 20%) can ensure that a satisfactory number of colors are selected. In the example illustrated in FIG. 9, there are five total colors that are present overall in the images. Applying a buffer to the results in FIG. 9, the total number of colors that should be selected for image labeling is six.

Referring back to FIG. 1, the selector module 133 includes one or more components of hardware and/or software program code for selecting a plurality of candidate colors to be used as image labels by the annotator 110, based on an output of the global color analyzer 201 and an output of the local color analyzer 202. For instance, the selector module 133 selects plurality of candidate colors so that a color of an image label used by an annotator is visually distinguishable from the one or more overall colors present in the plurality of images and the one or more colors present in an area of interest of the image. By selecting and assigning a color that is distinguishable from the pixel color of the images forming the dataset 110 for the image labels during an annotating process, the annotated dataset, when input into a computer vision AI, is more effectively detected. More effective detection results in improved computer vision models with improved image recognition output. In other words, the computer vision models are more efficient and accurate because the image labels are more recognizable by the computer vision model so it is less likely that a flagged, tagged, or bounded object in the annotated dataset will be overlooked (i.e. the image label will be less likely to blend into the background pixel colors of the datasets).

Figure 10:
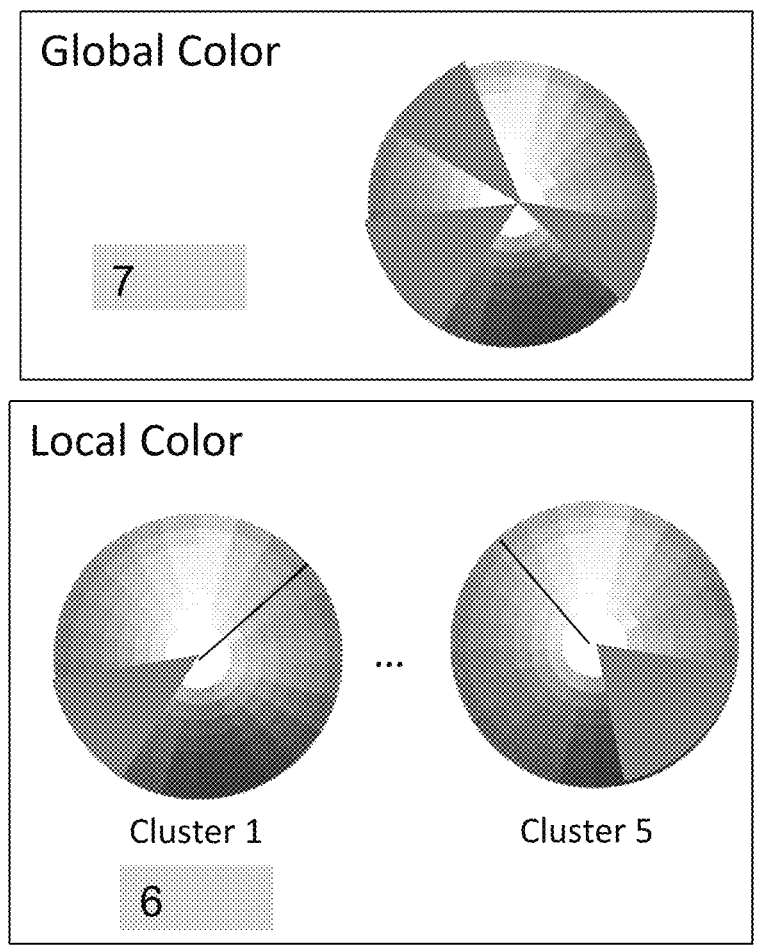
FIG. 10 depicts an output of the global color distribution and an output of the local color distribution, in accordance with embodiments of the present invention.

FIG. 10 depicts an output of the global color distribution and an output of the local color distribution, in accordance with embodiments of the present invention. The output of the global color distribution is the number of colors determined to be present in the overall dataset, in this example, the number is seven, with the optional buffer applied, as described above. The output of the global color distribution is also referred to as the colors and the number of colors to avoid using as image label colors, based on the overall color information of the dataset 110. To select the candidate colors, a portion of a full color spectrum associated with the colors determined by the global color distribution is masked, or otherwise indicated as non-selectable colors. The selector module 133 selects colors not masked within the color spectrum. In an exemplary embodiment, the selector module 133 selects a color that is opposingly located from the masked portion on the color spectrum.

The output of the local color distribution is the number of colors determined to be present in one or more areas of interest within each image of the dataset, in this example, the number is 6, with the optional buffer applied, as described above. The output of the local color distribution is also referred to as the colors and the number of colors to avoid using as image label colors, based on the overall color information of the dataset 110. Additionally, because the local color distribution predicts the objects and the number of objects, the selector module 133 can select candidate colors that account for the different objects within the image. To select the candidate colors, a portion of a full color spectrum associated with the colors determined by the local color distribution is masked, or otherwise indicated as non-selectable colors. The selector module 133 selects colors not masked within the color spectrum. In an exemplary embodiment, the selector module 133 selects a color that is opposingly located from the masked portion on the color spectrum. Moreover, the selector module 133 can automatically assign the candidate color to an image label for a specific dataset 110 being an annotated by the annotator 110. For instance, after the dataset 110 analyzed and prepared by the image label color selection application 130, the selector module 133 automatically assigns the candidate colors to image labels of the annotator 110 so that a color is automatically applied for each image label as an annotator labeling an image within the dataset labels the image.

Further, if the global color distribution results in a total number of colors that differs from the total number of colors identified by the local color distribution, the selector module 133 selects the higher number between the two outputs. In the illustrated example, the selector module 133 selects seven total candidate colors because the global color distribution results in seven colors, while the local color distribution resulted in six colors.

The adjustor module 134 includes one or more components of hardware and/or software program code for adjusting or altering an image or a portion of the image based on a brightness of the image. For instance, the adjustor module 134 solves the problem of an image being so dark that the image label is hard to see. The adjustor module 134 thus recognizes that an image is too dark by analyzing the brightness of the image, and then dynamically adjusts the color of the image label by increasing the brightness of the image label during the annotation process. Conversely, the adjustor module 134 solves the problem of an image being so bright that the image label is hard to see. The adjustor module 134 thus recognizes that an image is too bright by analyzing the brightness of the image, and then dynamically adjusts the color of the image label by decreasing the brightness of the image label during the annotation process. Each photograph of the dataset 110 may differ in brightness so the dynamic adjustor account for the brightness variation across all of the images forming the dataset 110.

Figure 11:
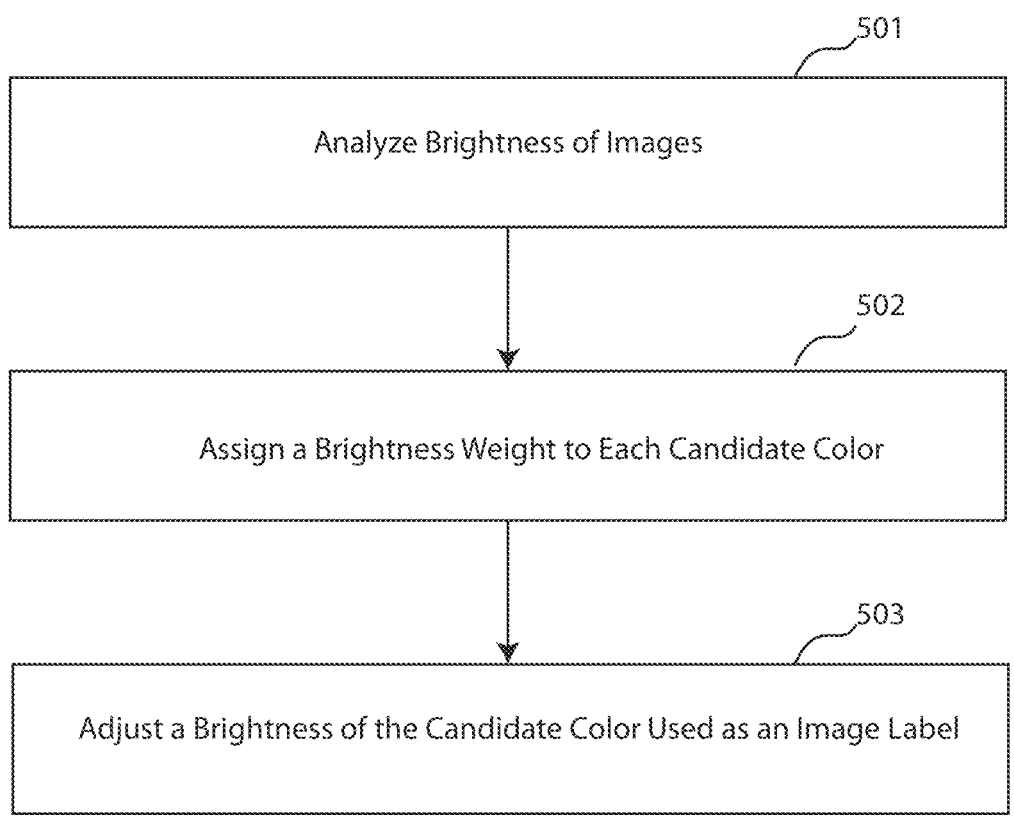
FIG. 11 depicts a flowchart of a method for dynamic adjustment, in accordance with embodiments of the present invention.

FIG. 11 depicts a flowchart of a method for dynamic adjustment, in accordance with embodiments of the present invention. Step 501 analyzes a brightness of the plurality of images. Step 502 assign a brightness weight to each color of the candidate colors. Step 503 adjusts a brightness of the candidate color used as an image label based on the brightness of the image being labeled. The dynamic adjustment can be performed during the annotation process and further increases the efficiency and accuracy of the computer vision AI model because the image label on the annotated dataset is more effectively detected. More effective detection results in improved computer vision models with improved image recognition output.

Figure 12A:
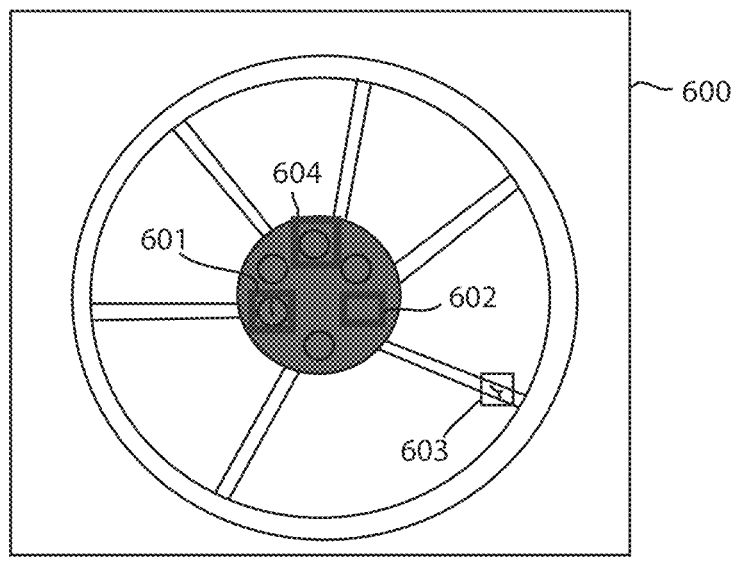
FIG. 12A depicts an annotated image without using the image label color selection system.
Figure 12B:
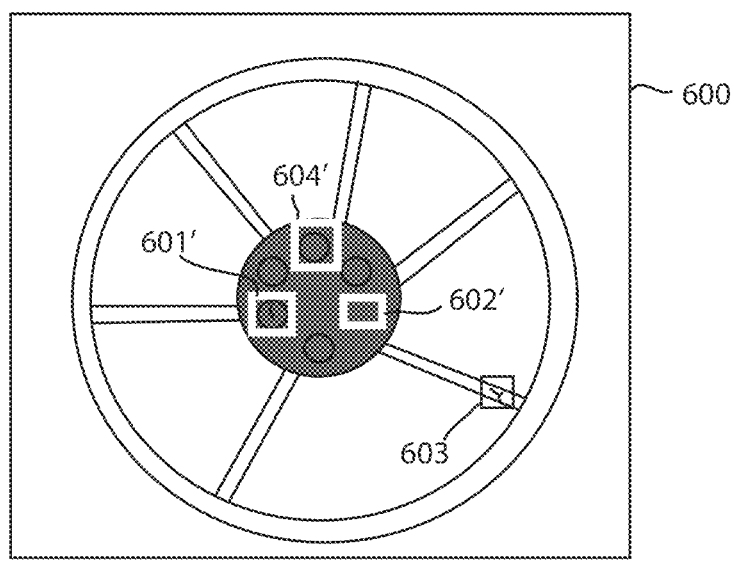
FIG. 12B depicts an annotated image using the image label color selection system, in accordance with embodiments of the present invention.

Referring now to FIGS. 12A-12B, an exemplary use of the image label color selection system 100 will be described. In the illustrated example, the goal is to build a computer vision model that can automatically detect defects of a rim of a vehicle. The model is trained with annotated datasets to detect a missing bolt, a correct bolt, a cracked bolt, or other scratch or defect on the rim. FIG. 12A depicts an annotated image without using the image label color selection system 100. Annotated image 600 includes four image labels 601, 602, 603, 604 (e.g. bounding boxes) to label or tag a missing bolt, a correct bolt, a cracked bolt, or other scratch or defect on the rim. Image label 601 identifies a cracked bolt, image label 602 labels a missing bolt, image label 603 labels a scratch on the rim strut, and image label 604 identifies a correct bolt. The color used for the image labels 601, 602, 603, 604 is similar to the color of the central rim area where the bolts are located (e.g. grey labels on gray object). When the model is trained using this image in the dataset, it is possible that the model will confuse the image labels with the pixels of the object so and mis-identify the label or miss the label altogether, reducing the effectiveness of the model and the efficiency of the training data.

If the image 600 were prepared and analyzed by the image label color selection system 100 prior to the annotation of the image, the colors of the image labels would be of a color that sticks out and is distinguishable from the color of the central rim area. FIG. 12B depicts an annotated image 600 that used the image label color selection system 100, in accordance with embodiments of the invention. The image label color selection system 100 has selected and assigned candidate colors for the image labels 601', 602', 603, and 604' that are visually distinguishable from the gray central area of the rim. Thus, the color of the image labels 601', 602', and 604' are now a color that is easily detectable against the grey color of the central rim area. Because the image labels 601', 602', and 604' are now more detectable, the chances that the model will overlook certain parts of the training data (e.g. missing the labels altogether) are greatly reduced. As a result, the training data used to train the model is more effective, and the model will yield more accurate output/results, and can potentially be trained faster than with less effective training data.

Various tasks and specific functions of the modules of the computing system 120 may be performed by additional modules, or may be combined into other module(s) to reduce the number of modules. Further, an embodiment of the computer or computer system 120 comprises specialized, non-generic hardware and circuitry (i.e., specialized discrete non-generic analog, digital, and logic-based circuitry) (independently or in combination) particularized for executing only methods of the present invention. The specialized discrete non-generic analog, digital, and logic-based circuitry includes proprietary specially designed components (e.g., a specialized integrated circuit, such as for example an Application Specific Integrated Circuit (ASIC), designed for only implementing methods of the present invention).

Furthermore, the image label color selection system 100 improves computer vision models, AI models, deep learning, neural networks, and overall image recognition technology by increasing the visibility of image labels of annotated datasets used to train the models. The image label color selection system 100 prepares the datasets prior to annotation so that the annotation process and annotator tools are more effective in annotating images, which is based on color information and image understanding. By preparing the datasets with the image label color selection system 100, image labels are more easily detected because candidate colors are adaptively selected for use when labeling and image. Improved detection by the models results in improved output efficiency of the models.

Figure 13:
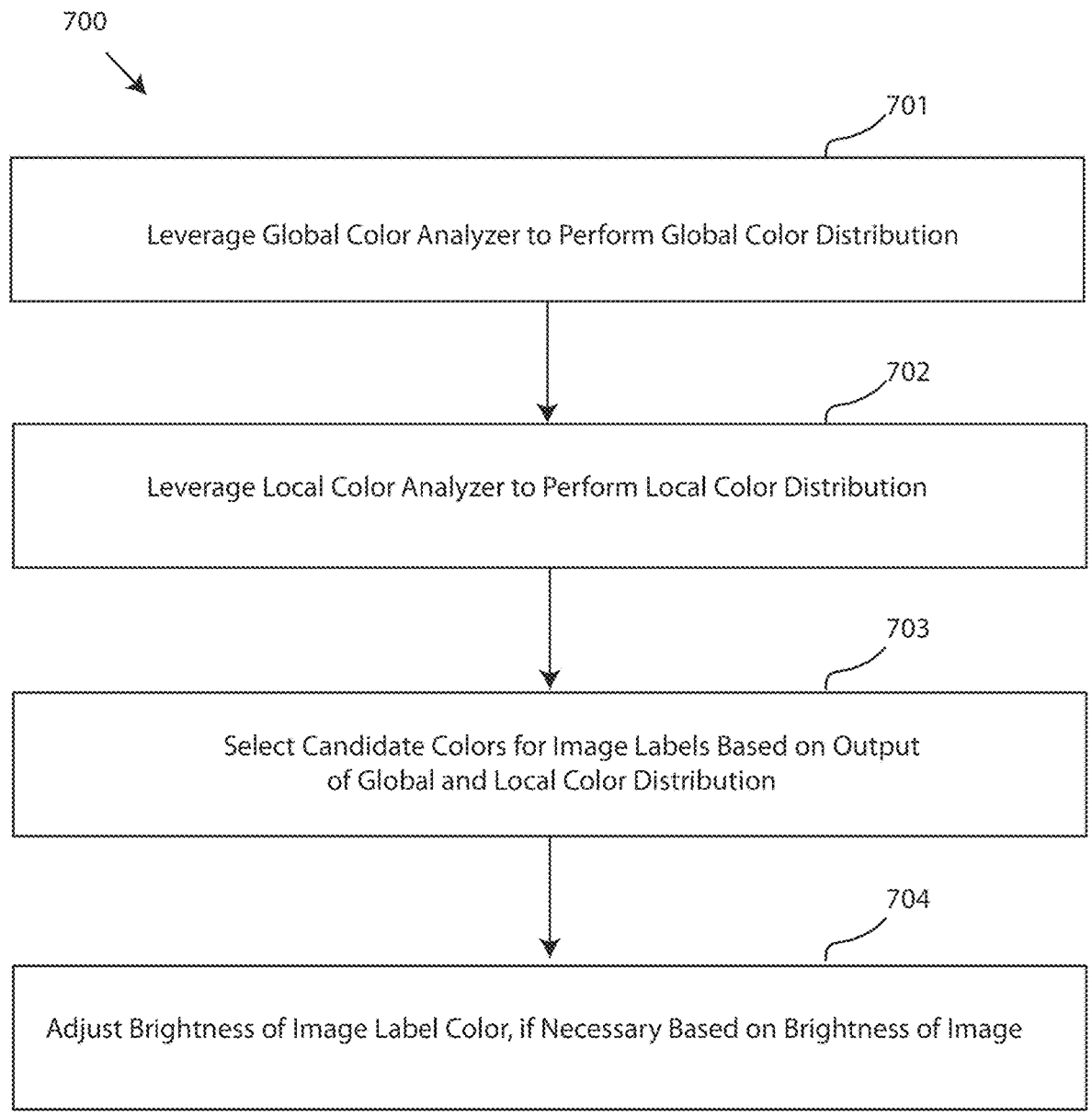
FIG. 13 depicts a flow chart of a method for adaptive color assignments to image labels during annotation of datasets, in accordance with embodiments of the present invention.

Referring now to FIG. 13, which depicts a flow chart of a method 700 for adaptive color assignments to image labels during annotation of datasets, in accordance with embodiments of the present invention. One embodiment of a method 700 or algorithm that may be implemented for adaptive color assignments to image labels during annotation of datasets with the image label color selection system 100 described in FIGS. 1-12B using one or more computer systems as defined generically in FIG. 14 below, and more specifically by the specific embodiments of FIG. 1.

Embodiments of the method 700 for adaptive color assignments to image labels during annotation of datasets, in accordance with embodiments of the present invention, may begin at step 701 wherein step 701 performs a global color distribution on a dataset. Step 702 performs a local color distribution on a dataset. Step 703 selects candidate colors based on the results of the global and local color distribution. Step 704 adjusts the brightness of the image label color during annotation, if necessary, based on a brightness of the image being annotated.

Figure 14:
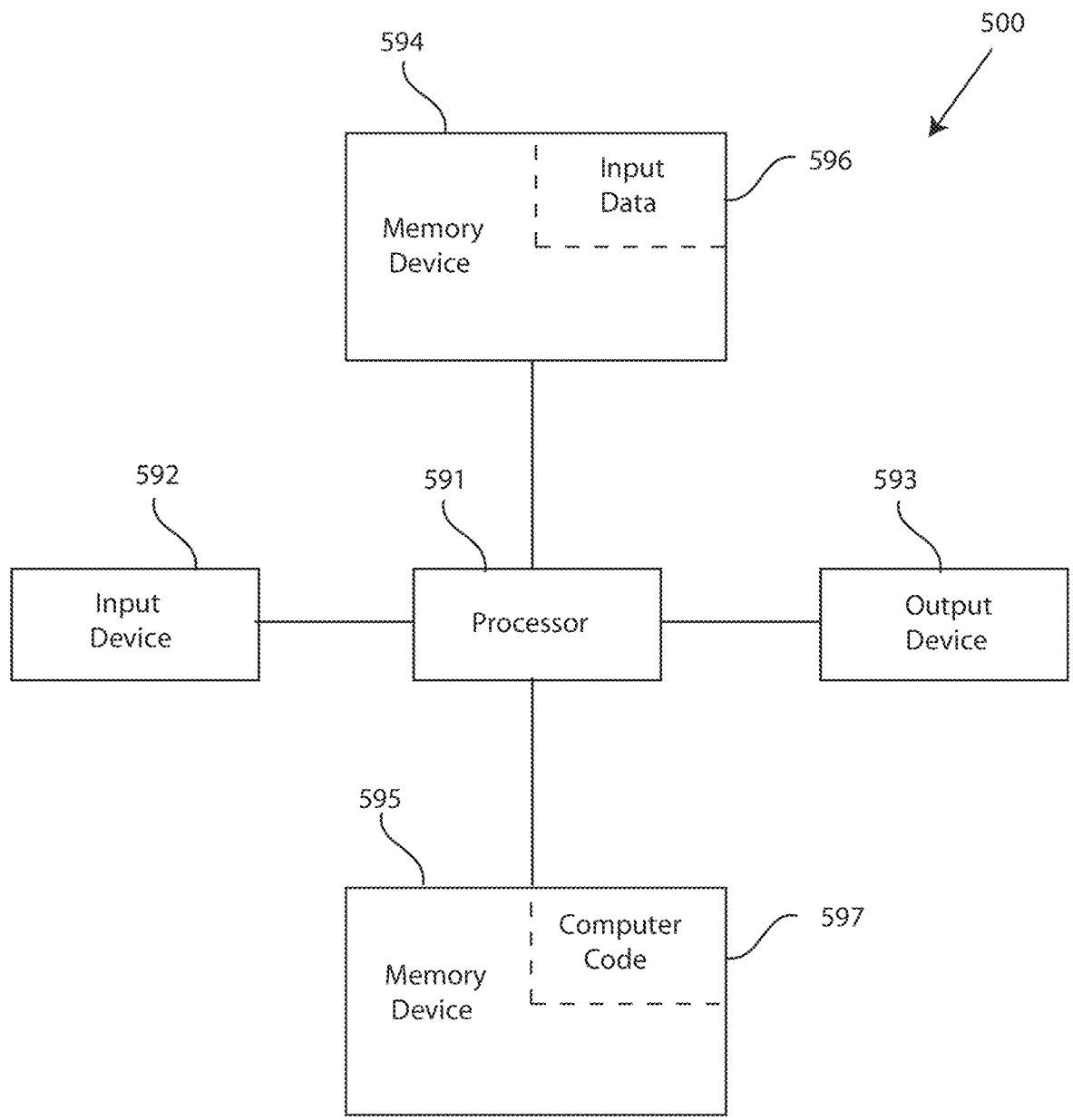
FIG. 14 depicts a block diagram of a computer system for classification system of FIGS. 1-12B, capable of implementing a method for adaptive color assignments to image labels during annotation of datasets of FIG. 13, in accordance with embodiments of the present invention.

FIG. 14 depicts a block diagram of a computer system for the image label color selection system 100 of FIGS. 1-12B, capable of implementing methods for adaptive color assignments to image labels during annotation of datasets of FIG. 13, in accordance with embodiments of the present invention. The computer system 500 may generally comprise a processor 591, an input device 592 coupled to the processor 591, an output device 593 coupled to the processor 591, and memory devices 594 and 595 each coupled to the processor 591. The input device 592, output device 593 and memory devices 594, 595 may each be coupled to the processor 591 via a bus. Processor 591 may perform computations and control the functions of computer system 500, including executing instructions included in the computer code 597 for the tools and programs capable of implementing a method for adaptive color assignments to image labels during annotation of datasets in the manner prescribed using the image label color selection system 100 of FIGS. 1-12B, wherein the instructions of the computer code 597 may be executed by processor 591 via memory device 595. The computer code 597 may include software or program instructions that may implement one or more algorithms for implementing the method for adaptive color assignments to image labels during annotation of datasets, as described in detail above. The processor 591 executes the computer code 597. Processor 591 may include a single processing unit, or may be distributed across one or more processing units in one or more locations (e.g., on a client and server).

The memory device 594 may include input data 596. The input data 596 includes any inputs required by the computer code 597. The output device 593 displays output from the computer code 597. Either or both memory devices 594 and 595 may be used as a computer usable storage medium (or program storage device) having a computer-readable program embodied therein and/or having other data stored therein, wherein the computer-readable program comprises the computer code 597. Generally, a computer program product (or, alternatively, an article of manufacture) of the computer system 500 may comprise said computer usable storage medium (or said program storage device).

Memory devices 594, 595 include any known computer-readable storage medium, including those described in detail below. In one embodiment, cache memory elements of memory devices 594, 595 may provide temporary storage of at least some program code (e.g., computer code 597) in order to reduce the number of times code must be retrieved from bulk storage while instructions of the computer code 597 are executed. Moreover, similar to processor 591, memory devices 594, 595 may reside at a single physical location, including one or more types of data storage, or be distributed across a plurality of physical systems in various forms. Further, memory devices 594, 595 can include data distributed across, for example, a local area network (LAN) or a wide area network (WAN). Further, memory devices 594, 595 may include an operating system (not shown) and may include other systems not shown in FIG. 14.

In some embodiments, the computer system 500 may further be coupled to an Input/output (I/O) interface and a computer data storage unit. An I/O interface may include any system for exchanging information to or from an input device 592 or output device 593. The input device 592 may be, inter alia, a keyboard, a mouse, etc. or in some embodiments the touchscreen of a computing device. The output device 593 may be, inter alia, a printer, a plotter, a display device (such as a computer screen), a magnetic tape, a removable hard disk, a floppy disk, etc. The memory devices 594 and 595 may be, inter alia, a hard disk, a floppy disk, a magnetic tape, an optical storage such as a compact disc (CD) or a digital video disc (DVD), a dynamic random access memory (DRAM), a read-only memory (ROM), etc. The bus may provide a communication link between each of the components in computer system 500, and may include any type of transmission link, including electrical, optical, wireless, etc.

An I/O interface may allow computer system 500 to store information (e.g., data or program instructions such as program code 597) on and retrieve the information from computer data storage unit (not shown). Computer data storage unit includes a known computer-readable storage medium, which is described below. In one embodiment, computer data storage unit may be a non-volatile data storage device, such as a magnetic disk drive (i.e., hard disk drive) or an optical disc drive (e.g., a CD-ROM drive which receives a CD-ROM disk). In other embodiments, the data storage unit may include a knowledge base or data repository 125 as shown in FIG. 1.

As will be appreciated by one skilled in the art, in a first embodiment, the present invention may be a method; in a second embodiment, the present invention may be a system; and in a third embodiment, the present invention may be a computer program product. Any of the components of the embodiments of the present invention can be deployed, managed, serviced, etc. by a service provider that offers to deploy or integrate computing infrastructure with respect to automatically classifying compartments at a security checkpoint. Thus, an embodiment of the present invention discloses a process for supporting computer infrastructure, where the process includes providing at least one support service for at least one of integrating, hosting, maintaining and deploying computer-readable code (e.g., program code 597) in a computer system (e.g., computer system 500) including one or more processor(s) 591, wherein the processor(s) carry out instructions contained in the computer code 597 causing the computer system to assign colors to image labels during annotation of datasets. Another embodiment discloses a process for supporting computer infrastructure, where the process includes integrating computer-readable program code into a computer system 500 including a processor.

The step of integrating includes storing the program code in a computer-readable storage device of the computer system 500 through use of the processor. The program code, upon being executed by the processor, implements a method for adaptive color assignments to image labels during annotation of datasets. Thus, the present invention discloses a process for supporting, deploying and/or integrating computer infrastructure, integrating, hosting, maintaining, and deploying computer-readable code into the computer system 500, wherein the code in combination with the computer system 500 is capable of performing a method for adaptive color assignments to image labels during annotation of datasets.

A computer program product of the present invention comprises one or more computer-readable hardware storage devices having computer-readable program code stored therein, said program code containing instructions executable by one or more processors of a computer system to implement the methods of the present invention.

A computer system of the present invention comprises one or more processors, one or more memories, and one or more computer-readable hardware storage devices, said one or more hardware storage devices containing program code executable by the one or more processors via the one or more memories to implement the methods of the present invention.

The present invention may be a system, a method, and/or a computer program product at any possible technical detail level of integration. The computer program product may include a computer-readable storage medium (or media) having computer-readable program instructions thereon for causing a processor to carry out aspects of the present invention.

The computer-readable storage medium can be a tangible device that can retain and store instructions for use by an instruction execution device. The computer-readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer-readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer-readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer-readable program instructions described herein can be downloaded to respective computing/processing devices from a computer-readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer-readable program instructions from the network and forwards the computer-readable program instructions for storage in a computer-readable storage medium within the respective computing/processing device.

Computer-readable program instructions for carrying out operations of the present invention may be assembler instructions, instruction-set-architecture (ISA) instructions, machine instructions, machine-dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer-readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer-readable program instructions by utilizing state information of the computer-readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer-readable program instructions.

These computer-readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer-readable program instructions may also be stored in a computer-readable storage medium that can direct a computer, a programmable data processing apparatus, and/or other devices to function in a particular manner, such that the computer-readable storage medium having instructions stored therein comprises an article of manufacture including instructions which implement aspects of the function/act specified in the flowchart and/or block diagram block or blocks.

The computer-readable program instructions may also be loaded onto a computer, other programmable data processing apparatus, or other device to cause a series of operational steps to be performed on the computer, other programmable apparatus or other device to produce a computer-implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 15:
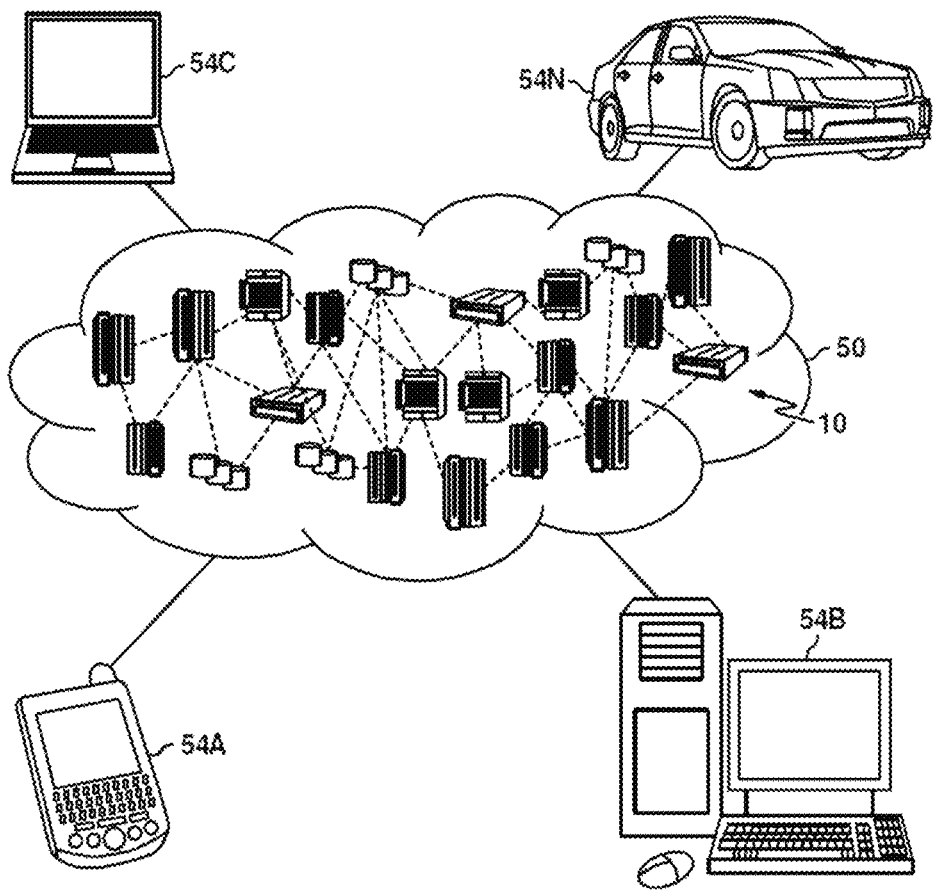
FIG. 15 depicts a cloud computing environment, in accordance with embodiments of the present invention.

Referring now to FIG. 15, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A, 54B, 54C and 54N shown in FIG. 15 are intended to be illustrative only and that computing nodes 10 and cloud computing environment 50 can communicate with any type of computerized device over any type of network and/or network addressable connection (e.g., using a web browser).

Figure 16:
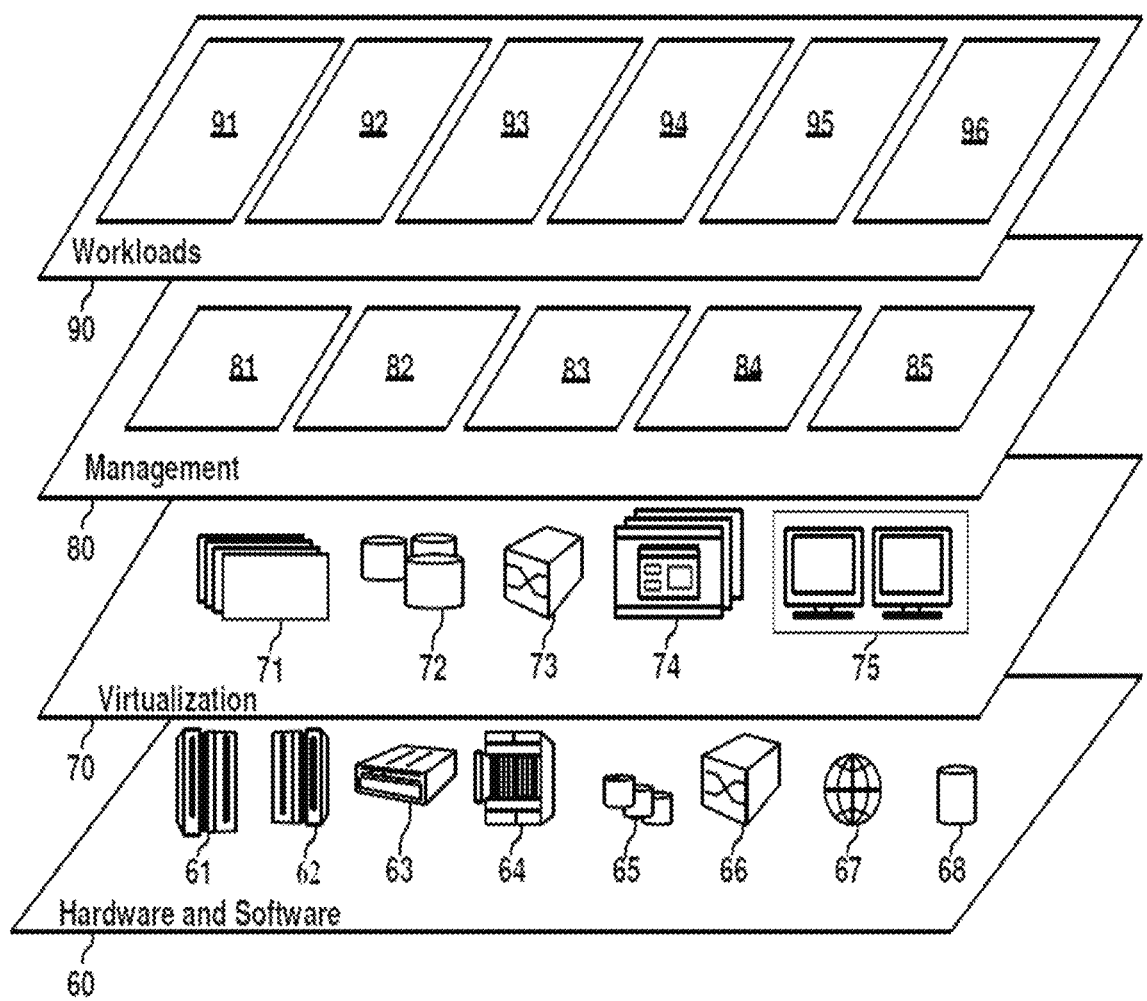
FIG. 16 depicts abstraction model layers, in accordance with embodiments of the present invention.

Referring now to FIG. 16 a set of functional abstraction layers provided by cloud computing environment 50 (see FIG. 15) are shown. It should be understood in advance that the components, layers, and functions shown in FIG. 16 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provides pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and color assignment 96.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method comprising:
   preparing, by a processor of a computing system, a dataset for image labeling by an annotator by:
   leveraging a global color analyzer to perform a global color distribution of a plurality of images to identify one or more overall colors present in the plurality of images, and a local color analyzer to perform a local color distribution for each image to identify one or more colors present in an area of interest of the image; and
   selecting, by the processor, a plurality of candidate colors to be used as image labels by the annotator, based on an output of the global color analyzer and an output of the local color analyzer.

2. The method of claim 1, wherein the plurality of candidate colors are selected so that a color of an image label used by an annotator is visually distinguishable from the one or more overall colors present in the plurality of images and the one or more colors present in an area of interest of the image.

3. The method of claim 1, further comprising:
   analyzing, by the processor, a brightness of the plurality of images;
   assign, by the processor, a brightness weight to each color of the candidate colors; and
   adjust a brightness of the candidate color used as an image label based on the brightness of the image being labeled.

4. The method of claim 1, further comprising: assigning, by the processor, a color from the plurality of candidate colors to an image label.

5. The method of claim 1, wherein the global color analyzer:
   divides each image of the training data into a plurality of sections;
   calculates a color histogram of each section of the plurality of sections;
   combines the color histogram of each section to derive image histograms of each image;
   clusters the image histograms to identify a total number of the one or more colors present in the training data overall; and
   adds a buffer to the total number of the one or more colors present in the training data overall to derive a maximum number of colors selectable as candidate colors.

6. The method of claim 1, wherein the local color analyzer:
   isolates the area of interest for each image of the dataset using a salient map, the area of interest containing an object;
   performs a color histogram on the area of interest; and
   clusters the color histogram of each image to identify a total number of the one or more colors present in the area of interest; and
   adds a buffer to the total number of the one or more colors present in the area of interest to derive a maximum number of colors selectable as candidate colors.

7. The method of claim 1, further comprising:
   annotating, by the processor, the dataset by labeling each image with at least one image label having a color selected from the plurality of candidate colors; and
   training, by the processor, an artificial intelligence model using the annotated dataset as training data.

8. A computing system, comprising:
   a processor;
   a memory device coupled to the processor; and
   a computer readable storage device coupled to the processor, wherein the storage device contains program code executable by the processor via the memory device to implement a method comprising:
   preparing, by the processor, a dataset for image labeling by an annotator by:
   leveraging a global color analyzer to perform a global color distribution of a plurality of images to identify one or more overall colors present in the plurality of images, and a local color analyzer to perform a local color distribution for each image to identify one or more colors present in an area of interest of the image; and selecting, by the processor, a plurality of candidate colors to be used as image labels by the annotator, based on an output of the global color analyzer and an output of the local color analyzer.

9. The computing system of claim 8, wherein the plurality of candidate colors are selected so that a color of an image label used by an annotator is visually distinguishable from the one or more overall colors present in the plurality of images and the one or more colors present in an area of interest of the image.

10. The computing system of claim 8, further comprising:
analyzing, by the processor, a brightness of the plurality of images;
assign, by the processor, a brightness weight to each color of the candidate colors; and
adjust a brightness of the candidate color used as an image label based on the brightness of the image being labeled.

11. The computing system of claim 8, further comprising: assigning, by the processor, a color from the plurality of candidate colors to an image label.

12. The computing system of claim 8, wherein the global color analyzer:
divides each image of the training data into a plurality of sections;
calculates a color histogram of each section of the plurality of sections;
combines the color histogram of each section to derive image histograms of each image;
clusters the image histograms to identify a total number of the one or more colors present in the training data overall; and
adds a buffer to the total number of the one or more colors present in the training data overall to derive a maximum number of colors selectable as candidate colors.

13. The computing system of claim 8, wherein the local color analyzer:
isolates the area of interest for each image of the dataset using a salient map, the area of interest containing an object;
performs a color histogram on the area of interest; and
clusters the color histogram of each image to identify a total number of the one or more colors present in the area of interest; and
adds a buffer to the total number of the one or more colors present in the area of interest to derive a maximum number of colors selectable as candidate colors.

14. The computing system of claim 8, further comprising:
annotating, by the processor, the dataset by labeling each image with at least one image label having a color selected from the plurality of candidate colors; and
training, by the processor, an artificial intelligence model using the annotated dataset as training data.

15. A computer program product, comprising a computer readable hardware storage medium storing a computer readable program code, the computer readable program code comprising an algorithm that when executed by a computer processor of a computing system implements a method comprising:

preparing, by the processor, a dataset for image labeling by an annotator by:
leveraging a global color analyzer to perform a global color distribution of a plurality of images to identify one or more overall colors present in the plurality of images, and a local color analyzer to perform a local color distribution for each image to identify one or more colors present in an area of interest of the image; and
selecting, by the processor, a plurality of candidate colors to be used as image labels by the annotator, based on an output of the global color analyzer and an output of the local color analyzer.

16. The computer program product of claim 15, wherein the plurality of candidate colors are selected so that a color of an image label used by an annotator is visually distinguishable from the one or more overall colors present in the plurality of images and the one or more colors present in an area of interest of the image.

17. The computer program product of claim 15, further comprising:
analyzing, by the processor, a brightness of the plurality of images;
assign, by the processor, a brightness weight to each color of the candidate colors; and
adjust a brightness of the candidate color used as an image label based on the brightness of the image being labeled.

18. The computer program product of claim 15, wherein the global color analyzer:
divides each image of the training data into a plurality of sections;
calculates a color histogram of each section of the plurality of sections;
combines the color histogram of each section to derive image histograms of each image;
clusters the image histograms to identify a total number of the one or more colors present in the training data overall; and
adds a buffer to the total number of the one or more colors present in the training data overall to derive a maximum number of colors selectable as candidate colors.

19. The computer program product of claim 15, wherein the local color analyzer:
isolates the area of interest for each image of the dataset using a salient map, the area of interest containing an object;
performs a color histogram on the area of interest; and
clusters the color histogram of each image to identify a total number of the one or more colors present in the area of interest; and
adds a buffer to the total number of the one or more colors present in the area of interest to derive a maximum number of colors selectable as candidate colors.

20. The computer program product of claim 15, further comprising:
annotating, by the processor, the dataset by labeling each image with at least one image label having a color selected from the plurality of candidate colors; and
training, by the processor, an artificial intelligence model using the annotated dataset as training data.

* * * * *